Aug. 9, 1932.  F. PITRELLA  1,870,923
WINDSHIELD HEATING DEVICE
Filed May 31, 1930
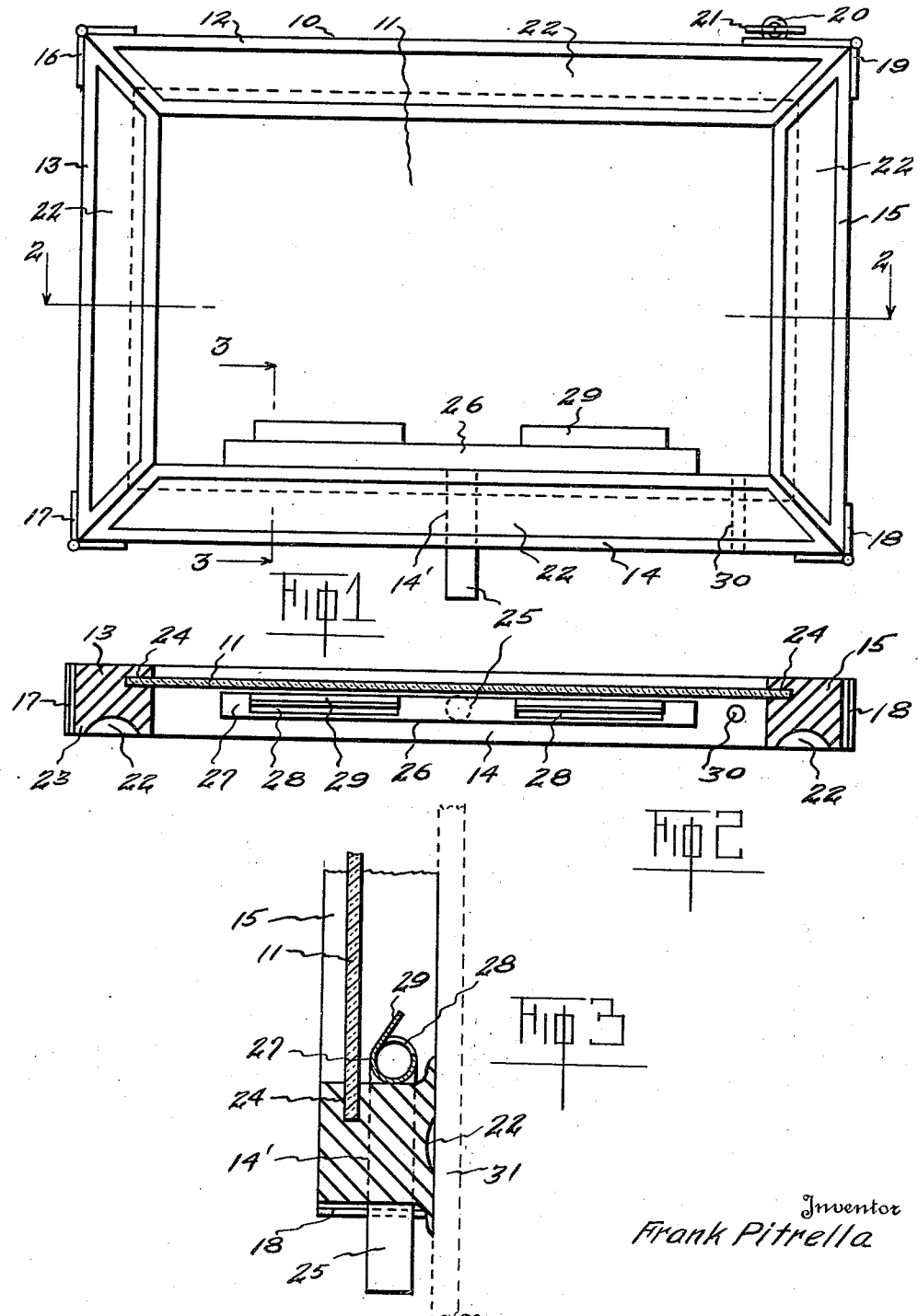
Inventor
Frank Pitrella
By Miller+Miller
Attorneys Patented Aug. 9, 1932

1,870,923

UNITED STATES PATENT OFFICE

FRANK PITRELLA, OF SENECA FALLS, NEW YORK

WINDSHIELD HEATING DEVICE

Application filed May 31, 1930. Serial No. 458,329.

The present invention relates to a windshield heating device especially adaptable for use on automobiles.

An object of this invention is to provide a windshield heating device that may be easily applied to the windshield to prevent the formation of ice and sleet thereon and readily removed therefrom when not needed, that is efficient in operation, that does not require any moving parts, and which will not interfere with the vision of the operator when in use.

Further objects of this invention will become apparent as the description thereof, given hereunder, proceeds, reference being had to the accompanying drawing wherein:—

Figure 1 is an elevational view of the windshield heater.

Figure 2 is a sectional view thereof on line 2—2, Figure 1.

Figure 3 is a sectional view on line 3—3, Figure 1.

The windshield heating device comprises essentially an articulated rectangular frame 10, which has mounted therein a glass window 11. The frame 10 is formed of four rods 12, 13, 14 and 15, preferably made of rubber, and hingedly connected together by means of hinges 16, 17, 18 and 19, said hinges being attached to said rods in any desired manner. The hinge 19 is fastened to one end of the rod 15, the other portion of said hinge being adapted to fit over an eye 20 carried by the end of the rod 12 adjacent the rod 15. To maintain the frame 10 in locked position a cotter pin 21 is inserted through the eye 20. The ends of each of the rods are mitered so that when in assembled relation the same will form a continuous unbroken frame, as is apparent.

Each of the rod members 12, 13, 14 and 15 are formed with an elongated cavity 22 extending substantially the full length of each of said rod members and defining a narrow margined wall 23 along the edges thereof. These cavities 22 are on the inner side of each of the rod members and function as vacuum cups to attach the frame to the windshield of an automobile (not shown) in the well known manner.

Formed in the inner side wall of each of the rod members is a groove 24 adapted to receive therein the edges of a sheet of glass 11, the grooves 24 being spaced slightly inwardly of the outer surface of said rod members as clearly shown in Figure 2. The glass window 11 is securely locked in place when the rod members are assembled and locked together to form the frame 10. In case the glass is broken a new one may be readily installed by merely opening up the frame.

Formed in the bottom rod member 14 between the cavity 22 and groove 24 is a central transverse opening 14' through which is inserted the stem 25 of a heat diverter 26. The heat diverter consists of a tubular member 27 closed at both ends and provided with two spaced slots 28 on the upper end thereof and vanes 29. The stem 25 is secured to the tube 27 intermediate the ends thereof, said tube being adapted to normally rest on the rod member 14. A port or opening 30 is formed in the rod member 14 adjacent an end thereof for a purpose to be hereinafter described.

The windshield heater, as above described, is attached to the windshield 31 of an automobile by means of the vacuum cavities 22 formed in the frame 10. A hose element (not shown) is attached to the hollow stem 25 of the heat diverter 26 the other end being tapped to the heating element of an automobile which is usually mounted on the exhaust manifold of an engine. Heated air is thus permitted to flow through the hose into the stem 25 and out of the slots 28 into the chamber formed by the frame 10 and glass window 11, the heat being deflected by the vanes 29 to impinge on the windshield of the automobile thereby warming and heating the same to prevent the accumulation of ice and sleet thereon, the heated air being permitted to escape through the opening 30.

If desired a manually controlled shut-off means may be mounted on the dash of the automobile to control the flow of heated air into the frame 10.

While a preferred form of my invention has been shown the same is nevertheless susceptible of many modifications within the scope of the appended claim.

Having thus described my invention, what I claim as new and desire to secure by Letters Patent is:—

A windshield heating device comprising an articulated frame, a window mounted in said frame, a heat diverter inside of said frame, means to convey heat to said diverter and means in said frame to attach the same to a windshield of an automobile, said articulated frame comprising a plurality of rod members of resilient non-metallic material pivotally attached together, and said last mentioned means comprising elongated cavities formed in the inner sides of said rod members and adapted to function as vacuum cups, said heat diverter comprising a slotted tubular member closed at both ends, laterally upwardly extending vanes adjacent said slots, a hollow stem on said tubular member and communicating with the interior thereof, an opening in one of the rod members of said frame through which said stem extends, and a port in said frame communicating with the atmosphere.

In testimony whereof I affix my signature.

FRANK PITRELLA.